United States Patent
Park et al.

(10) Patent No.: US 9,660,712 B2
(45) Date of Patent: May 23, 2017

(54) METHOD AND APPARATUS FOR TRANSMITTING DOWNLINK DATA ON BASIS OF BEAM RESTRICTED SUB-FRAME

(71) Applicant: LG ELECTRONICS INC., Seoul (KR)

(72) Inventors: Sungho Park, Seoul (KR); Jaehoon Chung, Seoul (KR); Sunam Kim, Seoul (KR); Soocheol Kyeong, Seoul (KR); Jinmin Kim, Seoul (KR); Kitae Kim, Seoul (KR); Kyunghaeng Lee, Seoul (KR); Hyunsoo Ko, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 14/765,802

(22) PCT Filed: Feb. 4, 2014

(86) PCT No.: PCT/KR2014/000945
§ 371 (c)(1),
(2) Date: Aug. 4, 2015

(87) PCT Pub. No.: WO2014/123336
PCT Pub. Date: Aug. 14, 2014

(65) Prior Publication Data
US 2015/0372737 A1    Dec. 24, 2015

Related U.S. Application Data

(60) Provisional application No. 61/762,303, filed on Feb. 7, 2013.

(51) Int. Cl.
*H04B 7/06* (2006.01)
*H04W 16/28* (2009.01)
(Continued)

(52) U.S. Cl.
CPC ......... *H04B 7/0617* (2013.01); *H04B 7/0452* (2013.01); *H04B 7/0456* (2013.01);
(Continued)

(58) Field of Classification Search
CPC ... H04B 7/0617; H04L 5/00; H04L 25/03929; H04W 4/02; H04W 24/08; H04W 24/10; H04W 72/04; H04W 72/12
See application file for complete search history.

(56) References Cited

U.S. PATENT DOCUMENTS 8,345,795 B1   1/2013  Lee et al.
2009/0069054 A1   3/2009  Zangi et al.
(Continued)

FOREIGN PATENT DOCUMENTS

JP    2012-147125    8/2012
KR    10-2012-0024340    3/2012
(Continued)

OTHER PUBLICATIONS

Texas Instruments, "Discussion on Further DL MIMO enhancement in Rel.12", 3GPP TSG RAN WG1 #72, R1-130761, Feb. 1, 2013, 3 pages.
(Continued)

*Primary Examiner* — Andrew Lai
*Assistant Examiner* — Leon Andrews
(74) *Attorney, Agent, or Firm* — Lee, Hong, Degerman, Kang & Waimey

(57) ABSTRACT

The method comprises: a step in which the base station transmits to a terminal configuration information related to the beam restricted sub-frame; and a step in which the base station transmits downlink data to the terminal via a sub-frame. The sub-frame includes the beam restricted sub-frame and a normal sub-frame, setting information includes information indicating a sub-frame set as the beam restricted
(Continued)

sub-frame among multiple sub-frames, the beam restricted sub-frame is a sub-frame transmitted only based on a first beam subset, the normal sub-frame is a sub-frame transmitted based on the first beam subset and a second beam subset, the first beam subset is the set of beams generated based on a first precoding matrix set, and the second beam subset is the set of beams generated based on a second precoding matrix set including the first precoding matrix set.

10 Claims, 13 Drawing Sheets

(51) Int. Cl.
| | | |
|---|---|---|
| *H04B 7/0452* | (2017.01) | |
| *H04B 7/0456* | (2017.01) | |
| *H04W 72/06* | (2009.01) | |
| *H04W 88/02* | (2009.01) | |
| *H04W 88/08* | (2009.01) | |
| *H04L 5/00* | (2006.01) | |

(52) U.S. Cl.
CPC ......... *H04B 7/0626* (2013.01); *H04L 5/0057* (2013.01); *H04L 5/0092* (2013.01); *H04W 16/28* (2013.01); *H04W 72/06* (2013.01); *H04L 5/0023* (2013.01); *H04W 88/02* (2013.01); *H04W 88/08* (2013.01)

(56) References Cited

U.S. PATENT DOCUMENTS

2014/0192762 A1\* 7/2014 Li ..................... H04L 25/03929
                                                                370/329
2014/0334329 A1\* 11/2014 Hwang ................. H04W 24/10
                                                                370/252

FOREIGN PATENT DOCUMENTS

| WO | 2012044019 A2 | 4/2012 |
| WO | 2012/141384 | 10/2012 |
| WO | 2012158959 A1 | 11/2012 |

OTHER PUBLICATIONS

PCT International Application No. PCT/KR2014/000945, Written Opinion of the International Searching Authority dated Apr. 29, 2014, 1 page.

\* cited by examiner

FIG. 3
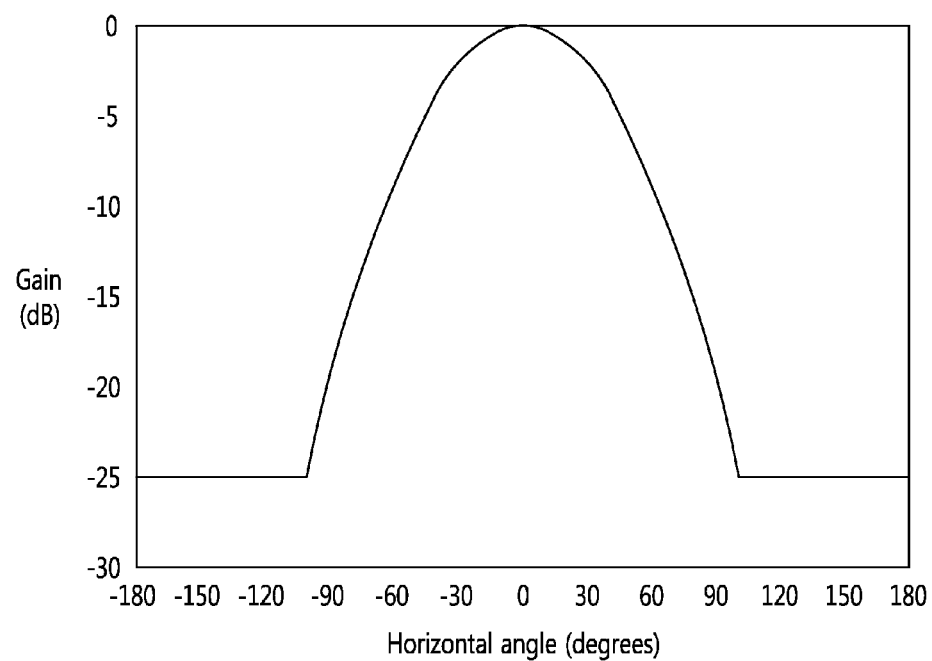
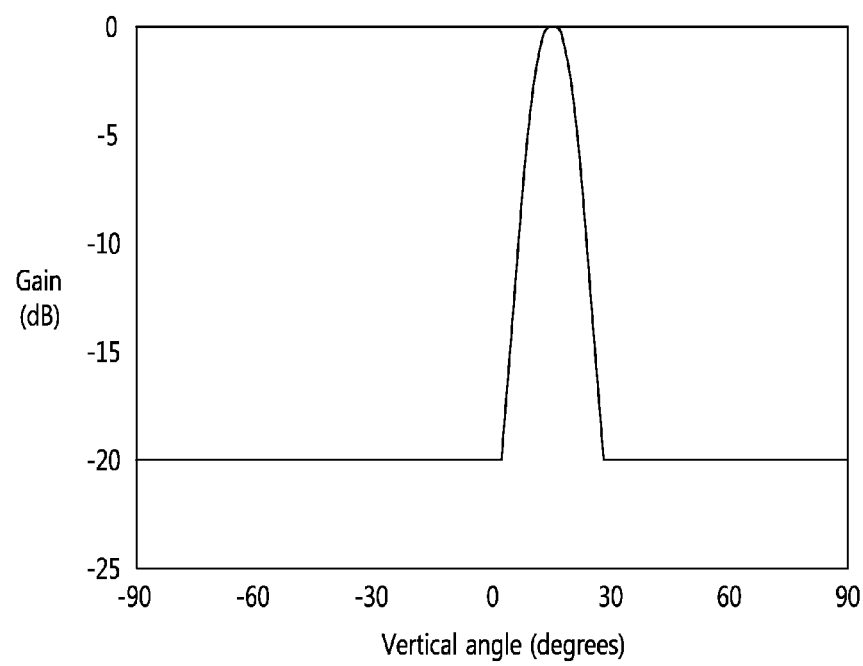

METHOD AND APPARATUS FOR TRANSMITTING DOWNLINK DATA ON BASIS OF BEAM RESTRICTED SUB-FRAME

CROSS-REFERENCE TO RELATED APPLICATIONS

This application is the National Stage filing under 35 U.S.C. 371 of International Application No. PCT/KR2014/000945, filed on Feb. 4, 2014, which claims the benefit of U.S. Provisional Application No. 61/762,303, filed on Feb. 7, 2013, the contents of which are all hereby incorporated by reference herein in their entirety.

BACKGROUND OF THE INVENTION

Field of the Invention

The present invention relates to wireless communications and, more particularly, to a method and apparatus for transmitting and receiving sub-frames.

Related Art

With an increase in demands for the next generation mobile communications and high-capacity data communications, high-quality high-speed multimedia communication services are gradually needed. In particular, the next generation mobile communication system aims to provide a high-speed link service between a base station and a plurality of users. As demands for the development of digital multimedia technologies and high-speed wireless transmission increase, attempts to realize Gigabits per second (Gbps) wireless transmission in indoor and outdoor short-distance high-speed wireless data communications are proceeding in global technology developed countries. This means that beam forming systems tracking desired signals at high speed and having a higher gain between communications are gradually being required.

Beamforming is an antenna technology, in which energy radiated by antennas is concentrated in a certain direction on a space. The purpose of beamforming is to receive stronger signals in a desired direction or transfer signals with more focused energy in a desired direction. In particular, the beamforming systems are required to realize various types of beams with a higher gain for manufacturing high-speed and high-capacity wireless communication systems.

For example, the beamforming systems may be used in communications in a higher path loss band, such as high-speed mass data communications, various kinds of aeronautical satellite communications where smart antennas are used in satellites, aircrafts, or the like, for a plurality of users, etc. Therefore, beamforming communications are being studied in various fields, such as the next generation mobile communications, various kinds of radar, military and aerospace communications, indoor and inter-building high-speed data communications, Wireless Local Area Network (WLAN), Wireless Personal Area Network (WPAN), etc.

SUMMARY OF THE INVENTION

An object of the present invention is to provide a method for transmitting and receiving beam restricted sub-frames.

Another object of the present invention is to provide an apparatus for transmitting and receiving beam restricted sub-frames.

To achieve the object of the present invention described above, a method for transmitting DownLink (DL) data by a base station (BS) according to an embodiment of the present invention, may include transmitting, by a BS, configuration information on a beam restricted sub-frame to a user terminal (UE); and transmitting, by the BS, DL data to the UE through a sub-frame. The sub-frames include the beam restricted sub-frame and a normal sub-frame. The configuration information includes information indicating a sub-frame set as the beam restricted sub-frame among a plurality of sub-frames. The beam restricted sub-frame is a sub-frame transmitted only on the basis of a first beam subset. The normal sub-frame is a sub-frame transmitted on the basis of the first beam subset and a second beam subset. The first beam subset may be a set of beams that are generated only on the basis of a first precoding matrix set, and the second beam subset may be a set of beams that are generated on the basis of a second precoding matrix set including the first precoding matrix set.

To achieve another object of the present invention described above, a BS according to an embodiment of the present invention includes a Radio Frequency (RF) unit configured to transmit and receive a wireless signal and a processor selectively connected to the RF unit. The processor is configured to transmit configuration information on a beam restricted sub-frame to a UE and to transmit DL data to the UE through a sub-frame. The sub-frame includes the beam restricted sub-frame and a normal sub-frame. The configuration information includes information indicating a sub-frame set as the beam restricted sub-frame among a plurality of sub-frames. The beam restricted sub-frame is a sub-frame transmitted only on the basis of a first beam subset. The normal sub-frame is a sub-frame transmitted on the basis of the first beam subset and a second beam subset. The first beam subset may be a set of beams that are generated on the basis of a first precoding matrix set, and the second beam subset may be a set of beams that are generated on the basis of a second precoding matrix set including the first precoding matrix set.

Defining a beam restricted sub-frames mitigates interference between a neighbor cell and a heterogeneous cell, increasing data transmission and reception efficiency.

BRIEF DESCRIPTION OF THE DRAWINGS

FIG. 3 illustrates a pattern of a beam generated by a BS in the case of considering conventional electrical tilting.

DESCRIPTION OF EXEMPLARY EMBODIMENTS

A User Equipment (UE) may be fixed or has mobility and may be referred to as terminology, such as Mobile Station (MS), Mobile Terminal (MT), User Terminal (UT), Subscriber Station (SS), wireless device, Personal Digital Assistant (PDA), wireless modem or handheld device.

A BS is generally a fixed station that communicates with a UE, and may be referred to as other terminology, such as evolved-NodeB (eNB), Base Transceiver System (BTS), or Access Point (AP).

Figure 1:
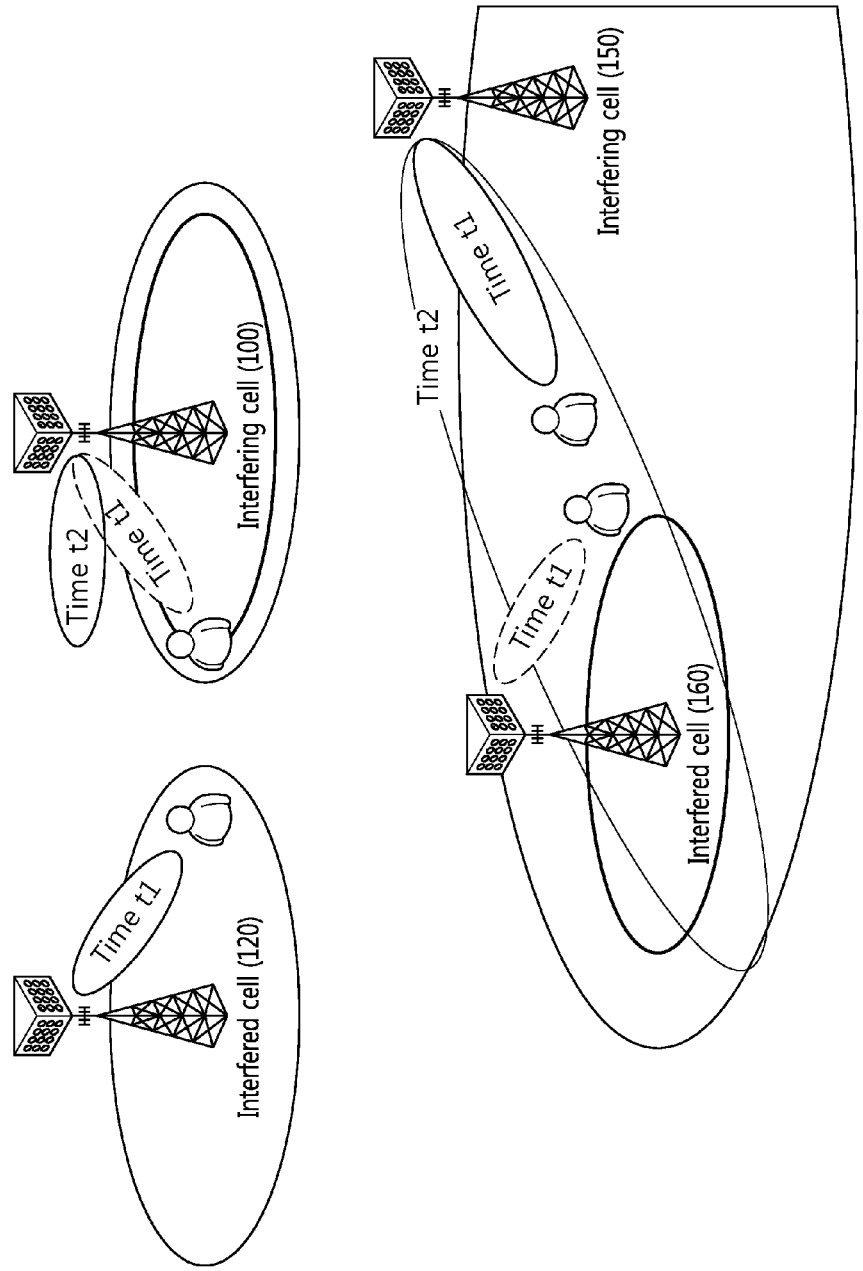
FIG. 1 is a schematic view illustrating an Enhanced Inter-Cell Interference Coordination (eICIC) technique.

FIG. 1 is a schematic view illustrating an eICIC technique.

FIG. 1 illustrates a method for distributing or avoiding interference by allocating different transmission power in the time domain per cell among eICIC techniques. This eICIC technique adopts 3GPP LTE-A Rel-10.

Referring to FIG. 1, transmission power of an interfering cell may be set to be different from each other in the time domain to remove inter-cell interference in the time domain. For example, an interfering cell may lower and transmit transmission power of a particular sub-frame to reduce the effect of influence on an interfered cell. As such, a sub-frame with lower transmission power than a general sub-frame is defined as the term "Almost Blank Sub-frame (ABS)". The 3GPP LTE may reduce interference through a method for defining and transmitting a configuration of such an ABS with respect to a certain time domain. For example, a 40-bit bitmap is sent in a 40 ms transfer cycle so that information on a configuration of ABS may be transmitted from a BS to a UE.

A UE receives two different kinds of assigned CSI measurement sub-frame sets (e.g., $C_{CSI,0}$ and $C_{CSI,1}$) from a higher layer and may transmit different feedback information to a BS per CSI measurement sub-frame.

The top of FIG. 1 illustrates a method for mitigating interference between neighbor cells by reducing transmission power by an interfering cell 100 at a time t1 when an interfered cell 120 transmits a sub-frame when the interfered cell 120 and the interfering cell 100 neighbor each other.

The bottom of FIG. 1 illustrates an interfering cell 150 and an interfered cell 160 in a Heterogeneous Network (HetNet). The HetNet can be formed by an overlap of small BSs with small coverage, such as micro, pico, or femto cells within a macro BS. Interference occurring in the interfered cell 160 may be reduced by lowering transmission power of a macro BS at the time t1 when the interfered cell 160, such as micro, pico, or femto cells, performs transmission. In the case of the HetNet as shown in the bottom of FIG. 1, a macro BS may adjust network load by moving the UE to a small BS adjacent thereto based on handover or cell (re)selection according to network load.

However, this time domain-based eICIC method may have restrictions on scheduling of a UE due to reasons other than network load on an interfering BS side. That is, the interfering BS may be limited in scheduling the UE in a certain sub-frame due to reasons other than network load (e.g., a limitation of transmission power for protecting a UE by an interfered BS in an HetNet environment or extending cell coverage in the same network environment).

In addition, in the top and bottom of FIG. 1, a beam transmitted by an interfering cell is classified by using transmission power at times t1 and t2, and this does not mean a change in the beam direction. Feedback information from the UE is not also explicitly divided and fed back or simultaneously made with respect to $C_{CSI,0}$ and $C_{CSI,1}$. In an embodiment of the present invention, interference that occurs between a neighbor cell and a mobile cell may be prevented by restricting a beam subset used to transmit a certain sub-frame as well as the time domain. Specific embodiments of this will be described below.

Figure 2:
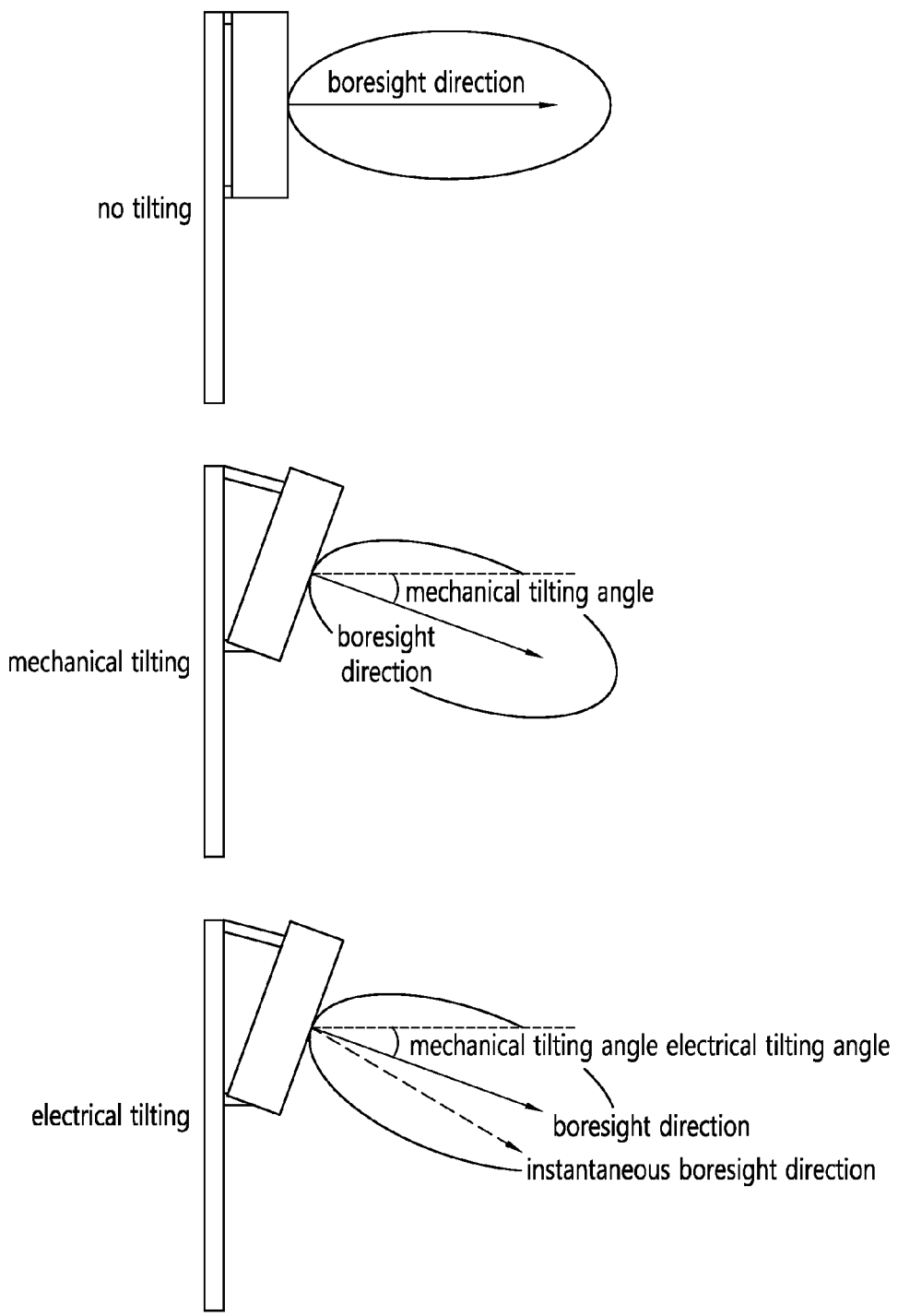
FIG. 2 is a schematic view illustrating an antenna tilting method.

FIG. 2 is a schematic view illustrating an antenna tilting method.

The top of FIG. 2 illustrates a case that antenna tilting is not performed, the middle of FIG. 2 shows mechanical tilting, and the bottom of FIG. 2 represents electrical tilting.

Referring to FIG. 2, a conventional cellular system has adopted a method for reducing, by a BS, inter-cell interference based on mechanical tilting or electrical tilting and improving a Signal to Interference-plus-Noise Ratio (SINR) of UEs in the cell. However, in the case of mechanical tilting, there is a disadvantage that the beam direction is fixed in the initial installation and that since a mechanical tilting angle is determined according to the height of a building where the BS is to be installed and the height of a support, a radiation beam width needs to be wider. In the case of electrical tilting, it has a downside in that a tilting angle may be changed by using an internal phase shift module, but only very restrictive vertical beamforming is possible due to actually cell-fixed tilting. When an Active Antenna System (AAS) is employed, free horizontal beamforming and/or vertical beamforming may be implemented, compared with conventional tilting.

FIG. 3 illustrates a pattern of a beam generated by a BS in the case of considering conventional electrical tilting.

The top of FIG. 3 illustrates a general horizontal beam pattern, and the bottom of FIG. 3 shows a vertical beam pattern when it is assumed that an electrical tilting angle is 15 degrees.

The beam characteristics of an antenna considered in the 3GPP or generally known may have the following values. The vertical beam width may have an angle of about 10° to about 15° based on a Half Power Beam Width (HPBW) standard, and the horizontal beam width may have an angle of about 65° to about 70° based on the HPBW standard. Here, the HPBW means a beam considering 3 dB gain attenuation. The HPBW may represent a sharpness of the main lobe using physical quantity that indicates a directivity level, as an order angle. A smaller HPBW means that a beam has sharper directivity. Using an active antenna may secure a wider beam width than a pattern of a beam generated by a BS in the case of using electrical tilting. This will be described below in more detail.

Figure 4:
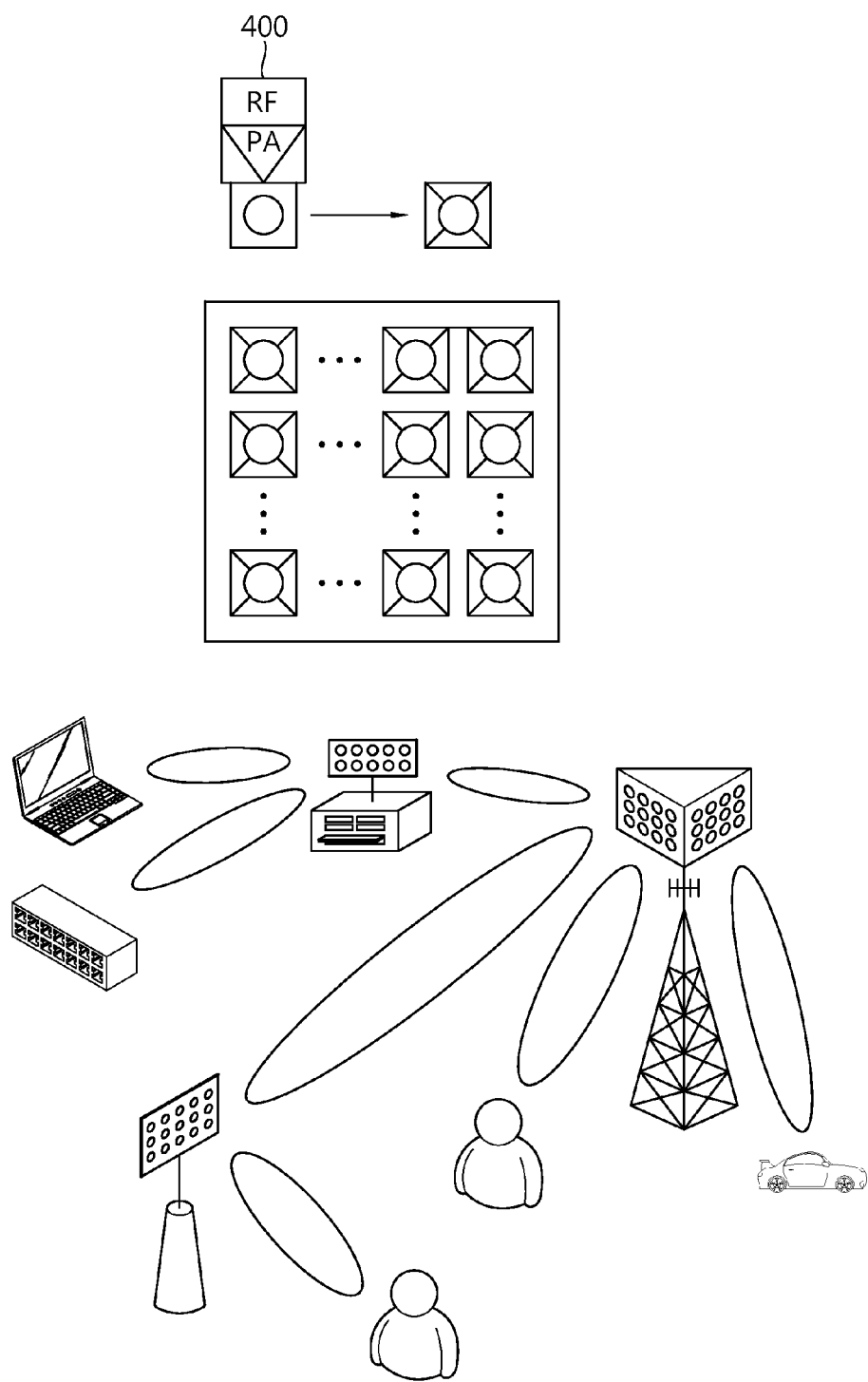
FIG. 4 is a schematic view illustrating an Active Antenna System (AAS).

FIG. 4 is a schematic view illustrating an AAS.

Referring to the top of FIG. 4, the AAS is realized in the form of coupling a Radio Frequency (RF) module 400 to each antenna that is a passive device unlike a conventional passive antenna system. The AAS includes the RF module 400, i.e. an active device, in each antenna, adjusting power and phase of each antenna module. The AAS may improve matters related to antenna performance (e.g., an increase in the effective length of a small antenna, an increase in bandwidth, a reduction in a coupling and noise reduction, between array devices, or improved transmission power efficiency), enables high integration in connection with Microwave Integrated Circuit (MIC) and Monolithic Microwave Integrated Circuit (MMIC) technologies and, in particular, may recover a shortcoming caused by a high loss due to a transmission line, limited source power, a reduction in antenna efficiency, or a lack of a phase shifter with excellent performance when applied to millimeter wave band communication systems. Since each antenna is coupled to the RF module 400, each antenna can be controlled per port and adjusted in phase and output to suit communication environments and situations.

The bottom of FIG. 4 illustrates a method for transmitting a UE-specific beam based on an active antenna. Referring to the bottom of FIG. 1, in the case of using an active antenna, the beam direction is adjusted in a corresponding direction with respect to a certain target to control power based on the location of the target, performing beamforming to the target.

Figure 5:
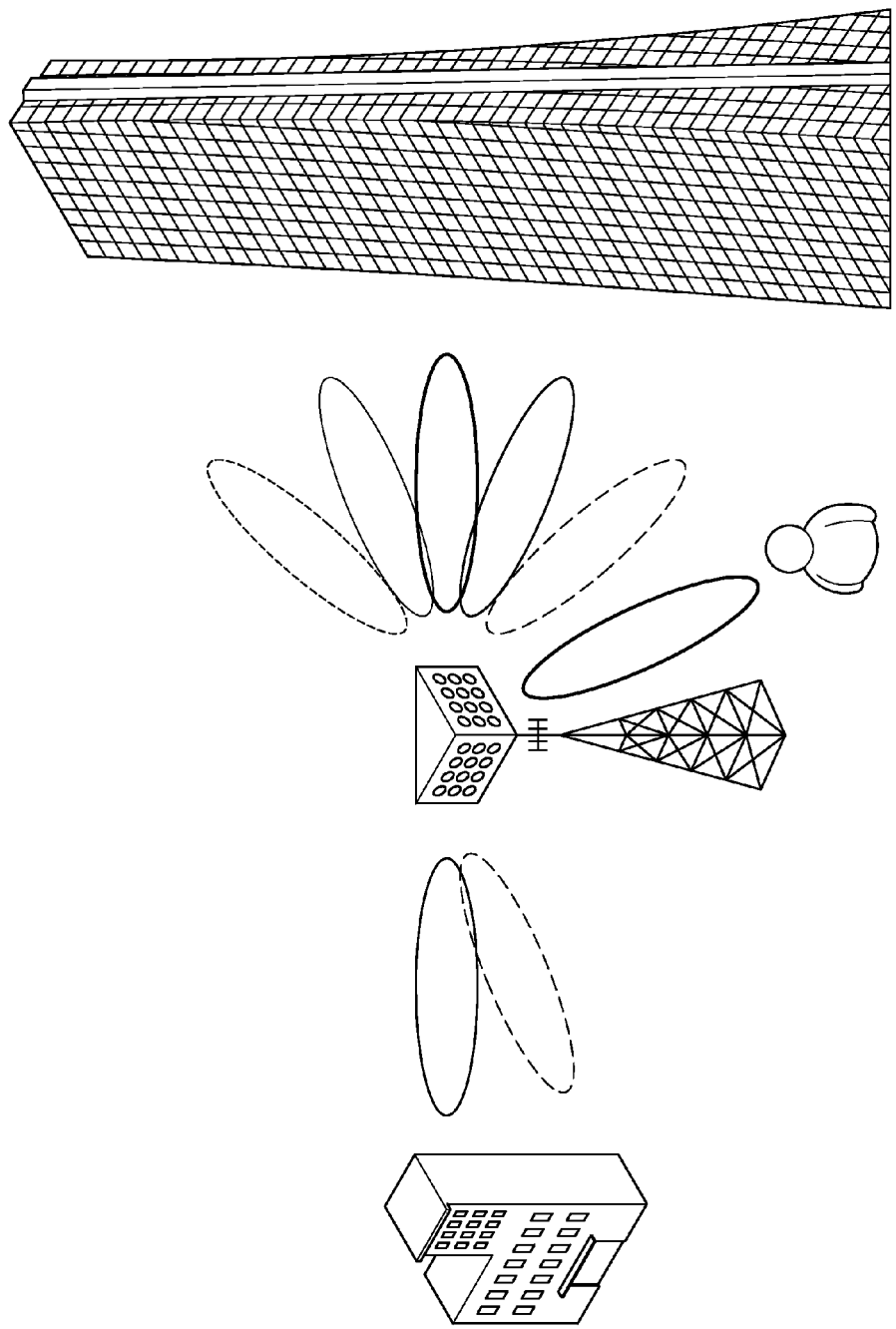
FIG. 5 is a schematic view illustrating a method for transmitting a UE-specific beam based on an active antenna.

FIG. 5 is a schematic view illustrating a method for transmitting a UE-specific beam based on an active antenna.

The FIG. 5 illustrates a method for transmitting a UE-specific beam based on a two-dimensional (2D) active antenna array.

A transmission environment using the 2D active antenna array might mainly include an Outdoor to Indoor (O2I) environment where an external BS transmits a signal to an indoor UE and an outdoor urban micro cell environment.

Referring to FIG. 5, transmitting a beam using the 2D active antenna array allows a BS to enable UE-specific horizontal beam steering and vertical beam steering considering various UE heights according to building heights, being used in a real cell environment where a plurality of various buildings exists in a cell.

A cell environment where a plurality of buildings with various heights in a cell exists may be taken into consideration. In this case, channel characteristics and the like that are very different from a conventional wireless channel environment may be considered. For example, a beam may be steered in consideration of a change in shade/path loss according to height difference, a change in the fading characteristics including Line of Sight (LoS)/Non-Line of Sight (NLoS), and Direction of Arrival (DoA), etc. In the case of considering vertical beam steering, it may be required that the BS and the UE measure a channel for a steering area including each of a vertical plane and a horizontal plane or the entire vertical plane and horizontal plane steered in the 2D antenna array and feedback the measured channel information. That is, the UE may need to calculate the best Channel State Information (CSI) on its own channel and an interfering channel. Using this channel information determination method increases computational complexity of the UE. Particularly, as the size of the antenna array rises for precise beam steering, computational complexity and feedback information of the UE are sharply increased.

Hereinafter, an embodiment of the present invention discloses an interference cancellation method that can be used in a multi-tier network or a multi-BS network while minimizing an increase in complexity to produce channel information for the 2D active antenna array.

In the embodiment of the present invention, beam may hereinafter be used as terminology including a real antenna radiation beam, precoding vector/matrix, precoding vector/matrix index, etc. The subset of beams may also mean an antenna radiation beam in a certain direction, a particular precoding vector/matrix or a specific precoding vector/matrix index. That is, the subset of beams may mean some among sets of beams that can be steered in the 2D active antenna array. Hereinafter, antenna that is the term used in the embodiment of the present invention may indicate a 2D active antenna array.

According to the embodiment of the present invention, the BS may define a sub-frame that is transmitted only by using a beam corresponding to a certain subset of beams that is a part of the entire set of beams. The sub-frame transmitted only by using a particular subset of beams may be defined as the term "beam restricted sub-frame. The BS may transmit configuration information on the beam restricted sub-frame to the UE. The UE may obtain information on the subset of beams used to transmit the beam restricted sub-frame on the basis of the configuration information thereon.

For example, when the BS a signal to the UE based on the 2D active antenna array, a composite precoding vector/matrix (P) that generates a composite beam for a horizontal area and a vertical area may be expressed as the following Equation 1.

$$P=PVPH(PV:\text{vertical precoding vector/matrix}, PH: \text{horizontal precoding vector/matrix}) \quad [\text{Equation 1}]$$

Referring to Equation 1, a precoding vector (or matrix) of a composite beam may be produced on the basis of a multiplication of a vertical precoding vector (or matrix) and a horizontal precoding vector (or matrix). The BS may transmit a sub-frame to the UE using a beam determined on the basis of a composite precoding vector/matrix. That is, the BS may transmit a beam restricted sub-frame to the UE through a beam generated by using a limited subset of beams (e.g., a beam generated on the basis of a certain composite precoding vector/matrix). Hereinafter, the embodiment of the present invention specifically discloses a configuration of this beam restricted sub-frame, a method for transmitting a beam restricted sub-frame to a UE by a BS using a limited subset of beams, and a method for transmitting CSI to a BS by a UE that receives a beam restricted sub-frame.

Steering a beam using the 2D active antenna array may have beam characteristics other than beam characteristics in a horizontal area and a vertical area based on conventional tilting. An active antenna-based beam in the horizontal area may have fast adaptive speed, a wider width, and a wider operating range. In addition, an active antenna-based beam in the vertical area may have fast adaptive speed, a wider width)(30°-90°, and a narrower operating range. Here, the adaptive speed may mean beam change speed, the beam width may mean an effective beam width for an antenna radiation beam, and the operating range may mean beam coverage in the entire beam area.

That is, when the 2D active antenna array is formed, the operating range of the vertical beam is narrower than the horizontal beam. In addition, the vertical beam may be changed within a limited set of beams, considering an actual movement of a target. On the basis of the characteristics of this 2D active antenna array, a beam restricted sub-frame may be configured. According to the embodiment of the present invention, using a beam restricted sub-frame may efficiently avoid interference while minimizing a restriction on the UE. For example, interference by other cells may be prevented by transmitting data using other subset of beams, not a limited subset of beams used in a beam restricted sub-frame, in other cells at a time when a certain cell transmits a beam restricted sub-frame. Hereinafter, an embodiment of the present invention discloses a subset of beams, which restricts a beam steering area of the vertical beam area, to mainly transmit a beam restricted sub-frame. The subset of beams for transmitting a beam restricted sub-frame may be, however, a beam subset for restricting a beam steering area of the vertical beam area and a beam subset for limiting the horizontal beam area.

Figure 6:
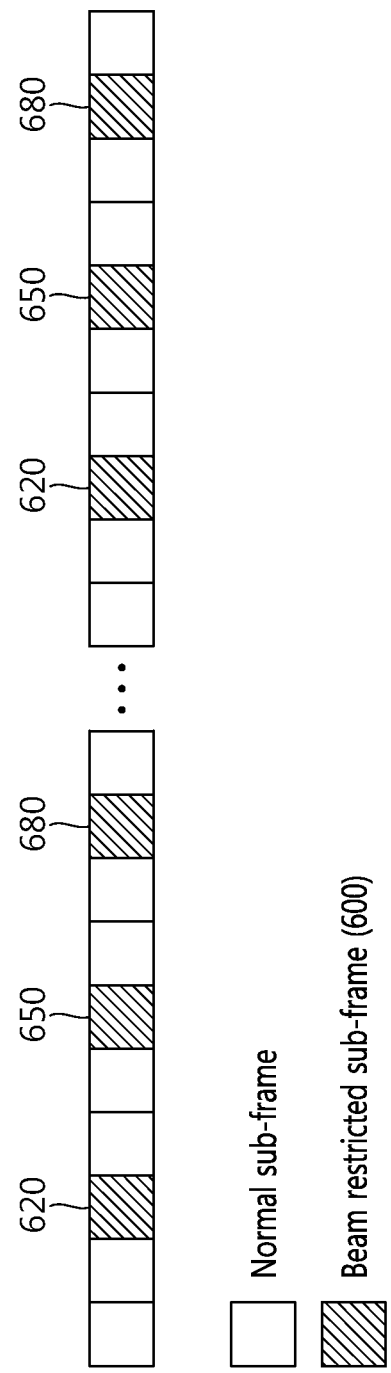
FIG. 6 is a schematic view illustrating a beam restricted sub-frame according to an embodiment of the present invention.

FIG. 6 is a schematic view illustrating a beam restricted sub-frame according to an embodiment of the present invention.

FIG. 6 illustrates a beam restricted sub-frame 600 set in a frame. The beam restricted sub-frame 600 may be a sub-frame in which a subset of beams for transmitting data to a receiver is limited. For example, a wireless frame may include the beam restricted sub-frame 600 and a normal sub-frames. The beam restricted sub-frame 600 may be a sub-frame transmitted only on a first beam subset basis, and the normal sub-frame may be a sub-frame transmitted on the first beam subset and a second beam subset. That is, the beam restricted sub-frame 600 may be a sub-frame in which a subset of beams for transmitting the beam restricted sub-frame 600 is limited. The normal sub-frame may be a sub-frame in which a subset of beams for transmitting the normal sub-frame is limited. A beam subset may be a beam generated on the basis of a certain precoding matrix. The first beam subset may be a set of beams generated on the basis of a first precoding matrix set and the second beam subset may be a set of beams generated on the basis of a second precoding matrix set including the first precoding matrix set.

For example, a BS may set a sub-frame #2 620, a sub-frame #5 650, and a sub-frame #8 680, which are 3rd, 6th, and 9th sub-frames in time among 10 sub-frames included in a frame, as the beam restricted sub-frame 600. The BS may transmit the beam restricted sub-frame 600 using a limited subset of beams on the basis of the configuration of the beam restricted sub-frame 600.

For example, only first, third, and fifth precoding matrixes may be set as a beam subset used to transmit data through the beam restricted sub-frame. In this case, for example, the BS may transmit a beam generated on the basis of one of the first, third, and fifth precoding matrixes to the UE through the beam restricted sub-frame.

The BS may transmit configuration information on the beam restricted sub-frame to the UE. For example, the BS may transmit the configuration information on the beam restricted sub-frame to the UE using a format of a bitmap. A transmission cycle of the configuration information on the beam restricted sub-frame may be set as an integer multiplication of a transmission cycle where a particular reference signal, such as a Channel State Information Reference Signal (CSI-RS), is transmitted. Alternatively, the configuration information on the beam restricted sub-frame may be transmitted according to a transmission and/or update cycle of Physical Broadcasting CHannel (PBCH). That is, information on the beam restricted sub-frame may be transmitted according to the transmission and/or update cycle of PBCH that is a Master Information Block (MIB) transmission channel including main system information. In this case, it is preferred that a transmission cycle of the configuration information on the beam restricted sub-frame may be 40 ms, and a bitmap format with a 40-bit length may be used to send the configuration information on the beam restricted sub-frame.

According to an embodiment of the present invention, another first beam restricted sub-frame is defined in a frame to be transmitted to a UE.

Figure 7:
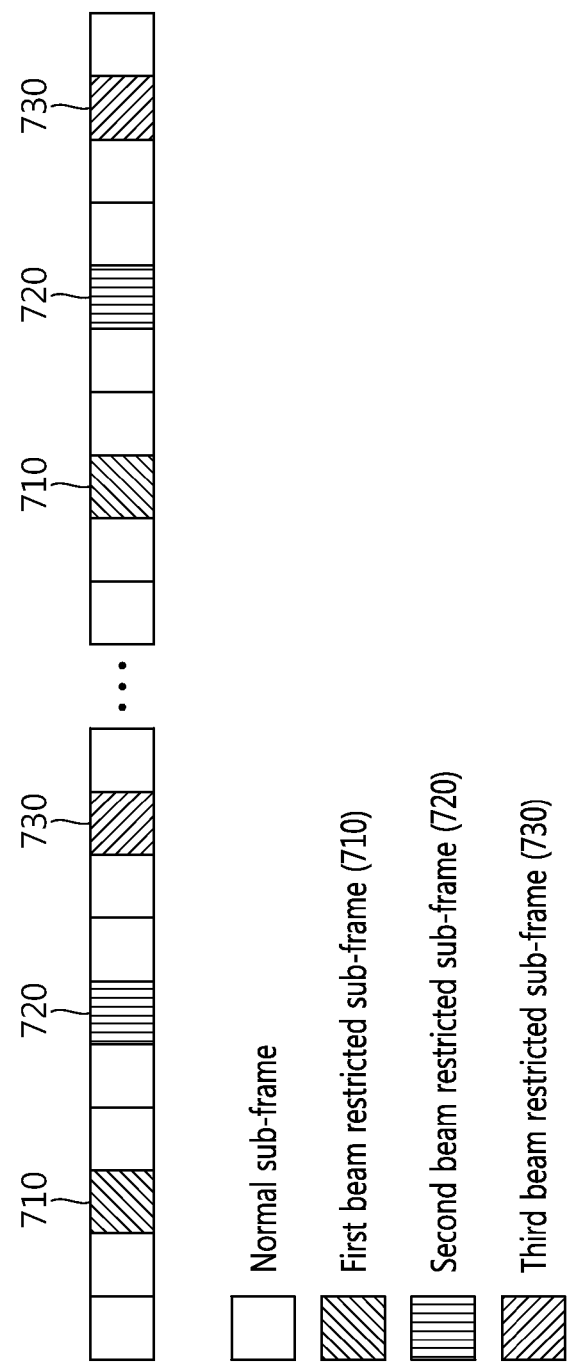
FIG. 7 is a schematic view illustrating a configuration of a beam restricted sub-frame according to an embodiment of the present invention.

FIG. 7 is a schematic view illustrating a configuration of a beam restricted sub-frame according to an embodiment of the present invention.

Referring to FIG. 7, a plurality of beam restricted sub-frames, such as a first beam restricted sub-frame 710, a second beam restricted sub-frame 720 and a third beam restricted sub-frame 730, may be set to a frame. The first beam restricted sub-frame 710 may indicate a sub-frame transmitted on the basis of a beam corresponding to a first beam subset upon transmission. Similarly, the second beam restricted sub-frame 720 may indicate a sub-frame transmitted on the basis of a beam corresponding to a second beam subset upon transmission and the third beam restricted sub-frame 730 may indicate a sub-frame transmitted on the basis of a beam corresponding to a third beam subset upon transmission.

The first, second and third beam subsets may be beam subsets including at least one different beam subset element (antenna radiation beam, precoding vector/matrix or precoding vector/matrix index).

For example, the first beam restricted sub-frame 710 may be a sub-frame set to a 3rd sub-frame preceding in time in a frame, the second beam restricted sub-frame may be a sub-frame set to a 6th sub-frame preceding in time in the frame, and the third beam restricted sub-frame may be a sub-frame set to a 9th sub-frame preceding in time in the frame.

Information on this configuration of the beam restricted sub-frame may be transmitted from a BS to a UE in a certain cycle based on a particular information format as described above. For example, according to a transmission cycle of the beam restricted sub-frame set to 40 ms, bitmap information for the configuration of the beam restricted sub-frame may be transmitted from the BS to the UE.

Figure 8:
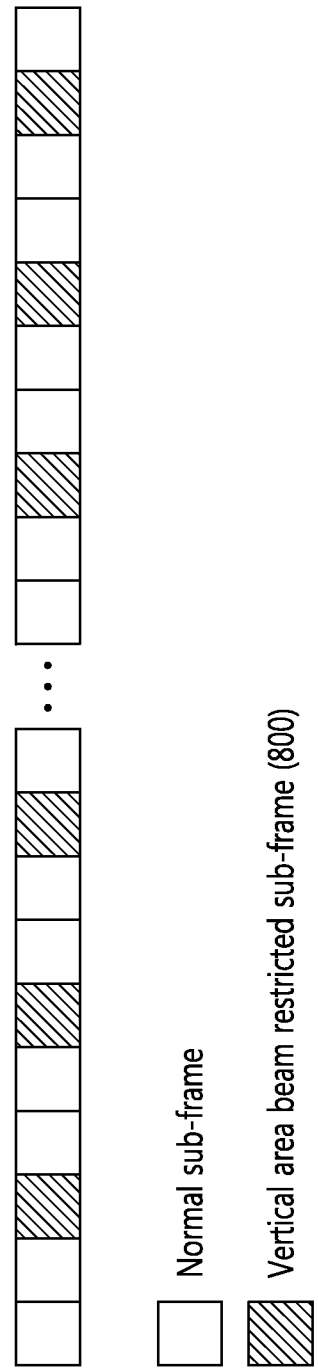
FIG. 8 is a schematic view illustrating a method for limiting a subset of beams in a beam restricted sub-frame according to an embodiment of the present invention.

FIG. 8 is a schematic view illustrating a method for limiting a subset of beams in a beam restricted sub-frame according to an embodiment of the present invention.

Referring to FIG. 8, a restricted subset of beams may be limited to a beam subset for steering a beam to the vertical beam area in limiting a subset of beams in the beam restricted sub-frame. This beam restricted sub-frame may be a vertical area beam restricted sub-frame 800.

For example, the vertical area beam restricted sub-frame 800 may limit a vertical area of a beam steered in an antenna array to a range of areas by restricting a used precoding matrix to a certain matrix. Limiting a vertical area of a beam to a range in the vertical area beam restricted sub-frame 800 enables a UE to undergo very limited interference when configurations of the vertical area of the beam are different from each other in the formation of a same horizontal beam. Thus, the vertical area beam restricted sub-frame 800 sets a beam restricted sub-frame not to interfere in another beam transmitted from a vertical area other than a corresponding vertical area by employing a method for limiting the vertical area of a beam.

Figure 9:
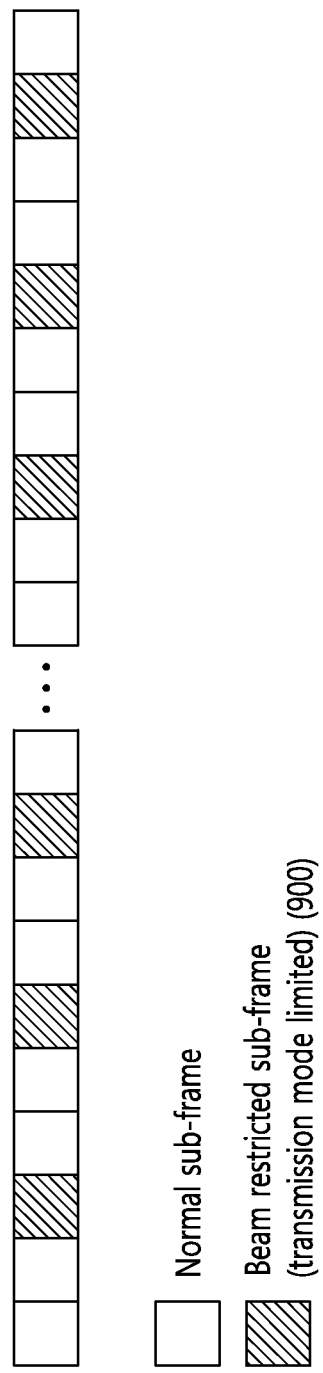
FIG. 9 is a schematic view illustrating a method for limiting a subset of beams in a beam restricted sub-frame according to an embodiment of the present invention.

FIG. 9 is a schematic view illustrating a method for limiting a subset of beams in a beam restricted sub-frame according to an embodiment of the present invention.

FIG. 9 illustrates a method for limiting transmission mode in which a beam restricted sub-frame is scheduled.

Referring to FIG. 9, a beam restricted sub-frame 900 may be set to be scheduled only in a certain transmission mode. That is, transmission mode that can be used in the beam restricted sub-frame 900 may be limited.

For example, it may be assumed that transmission mode of a BS is Multi User-Multi Input Multi Output (MU-MIMO). In this case, a plurality of UEs may be paired with the BS to transmit and receive respective data. Some of the plurality of UEs paired in this MU-MIMO transmission environment may not be UEs in a beam restricted environment where interference needs to be considered.

That is, when the beam restricted sub-frame 900 is set and transmitted to a plurality of UEs, data transmission and reception efficiency may be reduced. Thus, when a sub-frame specified by the BS is transmitted on the basis of transmission mode, such as MU-MIMO, the sub-frame may not be limited to be set to the beam restricted sub-frame 900. That is, a channel or signal transmitted to a UE that operates in MU-MIMO may not be scheduled in the beam restricted sub-frame 900.

In addition, according to the embodiment of the present invention, a BS may limit a rank used to transmit data in a beam restricted sub-frame when transmitting data in the beam restricted sub-frame. Data transmitted through the beam restricted sub-frame may be set to be transmitted from the BS to a UE on the basis of a certain rank.

Figure 10:
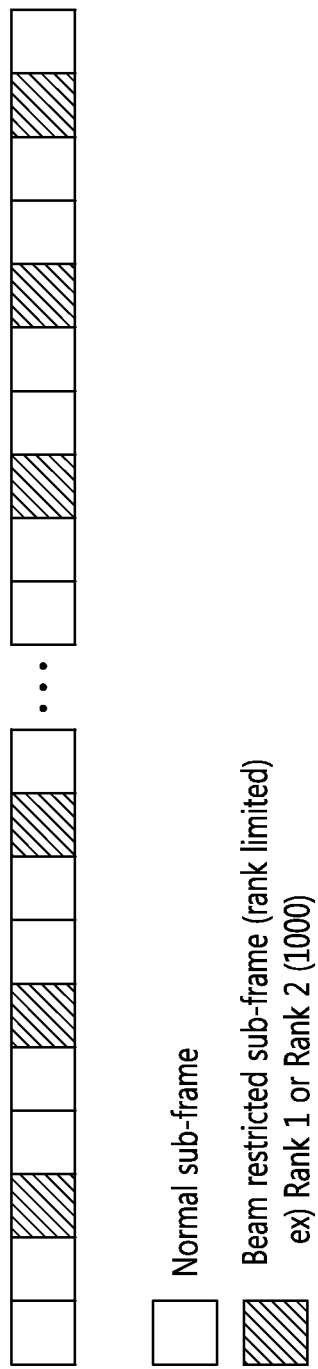
FIG. 10 is a schematic view illustrating a method for limiting a subset of beams in a beam restricted sub-frame according to an embodiment of the present invention.

FIG. 10 is a schematic view illustrating a method for limiting a subset of beams in a beam restricted sub-frame according to an embodiment of the present invention.

Referring to FIG. 10, for example, a rank value used when a BS transmits data to a UE through a beam restricted sub-frame 1000 may be defined as a value of Rank 1 or 2.

When a channel state is a relatively poor SINR condition in terms of SINR, the BS may select a rank value as 1 and transmit data. Alternatively, the BS may select a rank value as 1 and transmit data in a channel environment with higher spatial channel correlation. Since LoS may be a primary selection condition in this channel environment, a beam subset applicable in the beam restricted sub-frame 1000 may be limited.

If an antenna type is a dual polarized antenna, the BS may transmit data through the beam restricted sub-frame 1000 by expanding the transmission rank up to Rank 2. Alternatively, according to channel conditions, even though the antenna type is a co-polarized antenna, the BS may transmit data through the beam restricted sub-frame 1000 by expanding the rank value up to Rank 2.

As such, according to the embodiment of the present invention, a beam subset used to transmit data through the beam restricted sub-frame 1000 may be limited to a beam subset corresponding to a particular rank value, such as Rank 1 or 2. Another method for restricting a rank of a beam subset to transmit data through the beam restricted sub-frame 1000 is to transmit a beam restricted sub-frame by limiting a beam subset only with respect to a certain rank in transmitting the beam restricted sub-frame.

That is, it is possible to use a method for not restricting a rank itself that can be used in the beam restricted sub-frame 1000, limiting a beam subset usable in a certain rank, and not constraining a beam subset that can be employed in the remaining rank. For example, when a rank value for transmitting data through the beam restricted sub-frame 1000 is Rank 1 or 2, a beam subset usable in a corresponding rank may be restricted. On the contrary, when a rank value for transmitting data through the beam restricted sub-frame 1000 is the remaining rank except Rank 1 or 2, it may be set that a beam subset may not be restricted and the entire beam subset may be used in the corresponding rank.

According to the embodiment of the present invention, a UE may not need to recognize a vertical area beam and/or a horizontal area beam. For example, a BS may simply notify the UE of a plurality of CSI-RS configuration information with respect to a vertical beam and/or a horizontal beam and transmit respective CSI-RSs for the configuration information to the UE. The UE may simply feedback CSI, such as Channel Quality Indicator (CQI), Rank Index (RI), or Precoding Matrix Index (PMI), with respect to each of the received CSI-RSs. Thus, the vertical beam which is desired to be restricted in the present invention may, in this case, be an application to some of a plurality of CSI-RSs received from a plurality of BSs.

According to an embodiment of the present invention, a cell-specific virtual cell identifier may be assigned to a vertical beam area (or a vertical beam domain). Conventional electrical tilting-based elevation (vertical) beamforming is performed on the basis of a beam generally formed within 6° (within maximum 12°). On the other hand, active antenna-based vertical beamforming has a relatively wider beam operating width and a narrower beam width. The vertical beam domain may still, however, be more restrictive than a horizontal beam domain due to geometric characteristics between a UE and a BS. Moreover, as described above, UE-specific vertical beamforming may cause computational complexity of the UE and an increase in a feedback resource thereof In the embodiment of the present invention, when it is assumed that a beam subset for performing vertical beamforming is more restrictive than a beam subset for performing horizontal beamforming, a cell-specific virtual cell identifier (ID) may be assigned to a beam index for indicating the beam subset for performing vertical beamforming. The BS may perform vertical beamforming based on the assigned cell-specific virtual cell ID.

Figure 11:
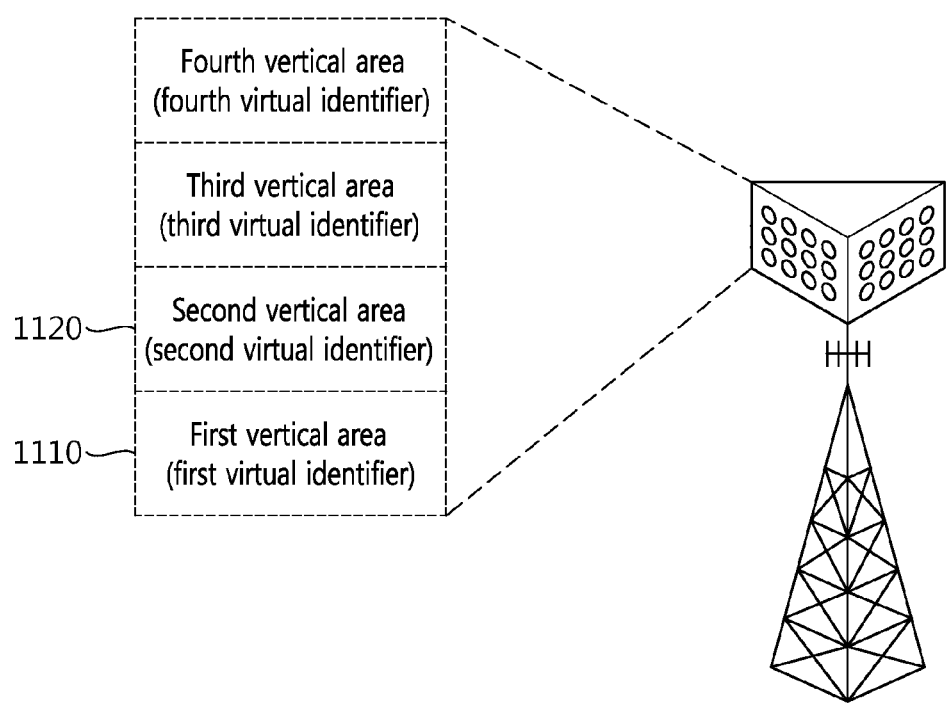
FIG. 11 is a schematic view illustrating a method for allocating a virtual cell identifier according to an embodiment of the present invention.

FIG. 11 is a schematic view illustrating a method for allocating a virtual cell identifier according to an embodiment of the present invention.

Referring to FIG. 11, a virtual cell ID is assigned to a virtual beam area so that a beam subset for determining a vertical beam or the vertical beam area can be identified.

For example, the virtual cell ID may be an ID that is expanded and determined on the basis of a default Physical Cell ID (PCI) allocated to a UE. For example, it is possible to indicate a beam subset used to steer a particular vertical area with a vertical beam index 0 and to assign a PCI to a vertical area steered on the basis of the vertical beam index 0.

Vertical beam indexes of 1 to x indicating the remaining beam subset used to steer other vertical areas may correspond to respective virtual cell IDs. For example, a first virtual cell ID may be given to a first vertical area 1110 and a second virtual cell ID to a second vertical area 1120, among the vertical areas.

Any cell ID within a subset except a PCI of the current cell among a total of 504 PCI sets may be selected and allocated as a virtual cell ID used to classify the vertical areas. Virtual cell IDs used to identify a vertical beamforming area in a BS may be selected not to overlap each other between beam indexes.

In addition, in performing carrier aggregation based on a plurality of carriers, when a plurality of vertical beam indexes is applied to each carrier, different virtual cell IDs need also to be assigned to each vertical beam domain.

According to an embodiment of the present invention, a UE is aware of a transmission timing of a beam restricted sub-frame through configuration information thereon provided by a BS. The UE may determine CSI, such as CQI, RI, or PMI, based on a channel and/or signal transmitted in the beam restricted sub-frame and feedback the determined CSI to the BS.

Figure 12:
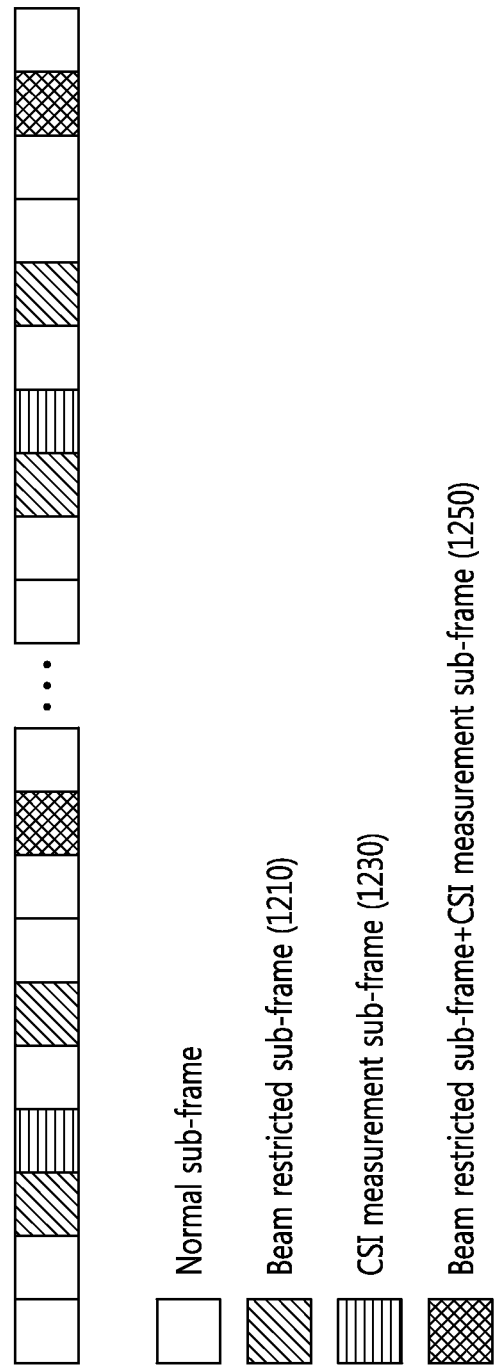
FIG. 12 is a schematic view illustrating a method for determining CSI by a UE according to an embodiment of the present invention.

FIG. 12 is a schematic view illustrating a method for determining CSI by a UE according to an embodiment of the present invention.

Referring to FIG. 12, the UE may first obtain configuration information on a beam restricted sub-frame from a BS. The UE may obtain information on a subset of beams that the BS uses to transmit data through a beam restricted sub-frame 1200 and 1250 on the basis of the configuration information thereon. In addition, the UE may obtain information on a CSI measurement sub-frame 1230 and 1250 that is a sub-frame used to determine CSI.

The UE may determine CSI based on the information on the beam restricted sub-frames and the information on the CSI measurement sub-frame 1230 and 1250 for determining CSI. For example, the UE may determine CSI in the CSI measurement sub-frame 1250 based on the information on the subset of beams that the BS uses to transmit data through the beam restricted sub-frame 1250 when the CSI measurement sub-frame is the beam restricted sub-frame 1250. The UE may feedback information on the determined CSI to the BS.

When the CSI measurement sub-frame is the beam restricted sub-frame 1250, a beam subset used to transmit a reference signal, such as a CSI-RS, through the CSI measurement sub-frame 1250 may be limited. For example, the beam subset used to transmit data through the CSI measurement sub-frame 1250 may be a beam subset that performs vertical beamforming with respect to a particular vertical area or other limited beam subsets. In addition, when a plurality of CSI-RSs is assigned to the CSI measurement sub-frame 1250, CSI may be produced on the basis of some of the CSI-RSs.

According to an embodiment of the present invention, when a CSI measurement sub-frame where a UE determines CSI is the beam restricted sub-frame 1250, a rank used to transmit the CSI measurement sub-frame 1250 may be limited. Thus, the UE may determine CSI based on data on the CSI measurement sub-frame 1250 transmitted by using a certain rank and feedback the determined CSI to the BS.

Additionally, according to an embodiment of the present invention, when a CSI measurement sub-frame is the beam restricted sub-frame 1250, a UE may report CSI measured on the basis of a limited beam subset to a BS with respect to a particular rank. As described above, the BS may limit a beam subset that can be used with respect to a certain rank value used to transmit the beam restricted sub-frame 1250. The UE may transmit, to the BS, CSI measured through data on the CSI measurement sub-frame 1250 transmitted on the basis of the limited beam subset with respect to the certain rank value.

In addition, according to an embodiment of the present invention, a sub-frame transmitted in a particular transmission mode, such as MU-MIMO, may not be set as a beam restricted sub-frame. Thus, when the UE obtains information on a sub-frame transmitted on the basis of MU-MIMO, a UE may determine CSI for the entire beam subset in the corresponding sub-frame 1250 and feedback the determined CSI to a BS.

Figure 13:
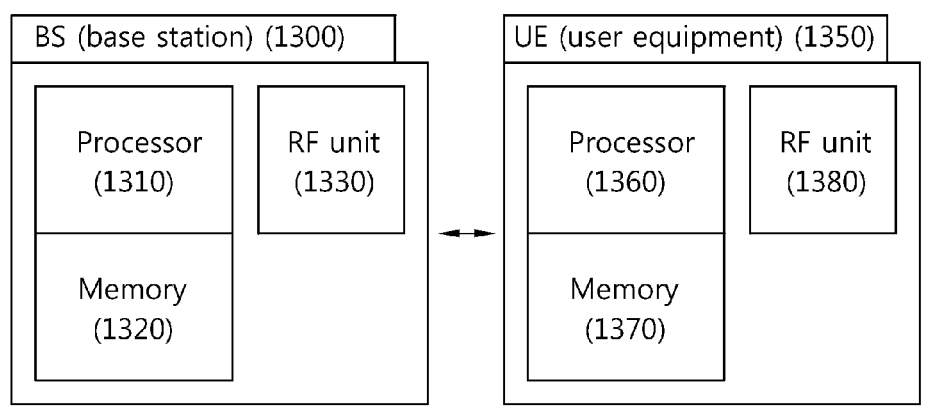
FIG. 13 is a block diagram illustrating a wireless communication system according to an embodiment of the present invention.

FIG. 13 is a block diagram illustrating a wireless communication system according to an embodiment of the present invention.

Referring to FIG. 13, a BS 1300 includes a processor 1310, a memory 1320 and an RF unit 1330. The memory 1320 is connected to the processor 1310 to store various information for driving the processor 1310. The RF unit 1320 is connected to the processor 1310 to transmit and/or receive a wireless signal. The processor 1310 implements the proposed functions, processes and/or methods. In the aforementioned embodiments, an operation of the BS may be implemented by the processor 1310.

For example, a wireless device 1350 includes a processor 1360, a memory 1370 and an RF unit 1380. The memory 1370 is connected to the processor 1360 to store various information for driving the processor 1360. The RF unit 1380 is connected to the processor 1360 to transmit and/or receive a wireless signal. The processor 1360 implements the proposed functions, processes and/or methods. In the aforementioned embodiments, an operation of the wireless device may be implemented by the processor 1360.

For example, the processor 1310 may be implemented to transmit configuration information on a beam restricted sub-frame to a UE and transmit DL data to the UE through a sub-frame. The sub-frame include the beam restricted sub-frame and a normal sub-frame. The configuration information includes information indicating a sub-frame set as the beam restricted sub-frame among a plurality of sub-frames. The beam restricted sub-frame is a sub-frame transmitted only on the basis of a first beam subset. The normal sub-frame is a sub-frame transmitted on the basis of the first beam subset and a second beam subset. The first beam subset may be a set of beams that are generated on the basis of a first precoding matrix set, and the second beam subset may be a set of beams that are generated on the basis of a second precoding matrix set including the first precoding matrix set.

The processor may include an Application-Specific Integrated Circuit (ASIC), other chipsets, a logical circuit and/or a data processing unit. The memory may include a Read Only Memory (ROM), a Random Access Memory (RAM), a flash memory, a memory car and/or other storage units. The RF unit may include a baseband circuit for processing a wireless signal. When the embodiments are implemented by software, the aforementioned techniques may be realized with the modules (processes, functions, etc.) that perform the above-mentioned functions. The modules may be stored in the memory and executed by the processor. The memory may be inside or outside the processor and connected to the processor with well-known various means.

In the aforementioned exemplary systems, the methods are described on the basis of the flowchart as a series of steps or blocks, but the present invention is not limited to the order of the steps, which steps can occur at other stages described above and in a different order or concurrently. In addition, it should be understood to those skilled in the art that the steps shown in the flow chart are not exclusively, or may include other steps, or one or more of the steps of the flowchart may be deleted without affecting the scope of the invention.

What is claimed is:

1. A method for transmitting downlink (DL) data in a Base Station (BS), the method comprising:
    transmitting, by the BS, configuration information on a beam restricted sub-frame to a user equipment (UE); and
    transmitting, by the BS, DL data to the UE through a sub-frame,
    wherein the sub-frame includes the beam restricted sub-frame and a normal sub-frame,
    wherein the configuration information includes information indicating a sub-frame set as the beam restricted sub-frame among a plurality of sub-frames,
    wherein the beam restricted sub-frame is a sub-frame transmitted based on only a first beam subset,
    wherein the normal sub-frame is a sub-frame transmitted based on the first beam subset and a second beam subset,
    wherein the first beam subset is a set of beams generated based on a first precoding matrix set, and wherein the second beam subset is a set of beams generated based on a second precoding matrix set including the first precoding matrix set.

2. The method of claim 1, wherein the first beam subset is a set of vertical precoding matrixes restricting an area of a vertical beam radiated to a vertical area, and
wherein the area of the vertical beam is a certain vertical space area where a virtual physical cell identifier (ID) is assigned.

3. The method of claim 1, wherein the beam restricted sub-frame is a sub-frame used only in the transmission of rank 1 or rank 2.

4. The method of claim 1, wherein the beam restricted sub-frame is set to UEs that do not operate in multi-user multiple-input multiple-output (MU-MIMO).

5. The method of claim 1, further comprising:
transmitting, by the BS, information on the first beam subset used to transmit the beam restricted sub-frame to the UE; and
receiving, by the BS, channel state information (CSI) from the UE,
wherein the CSI is determined based on the information on the first beam subset.

6. A base station (BS) operating in a wireless communication network, the BS comprising:
a Radio Frequency (RF) unit configured to transmit and receive a wireless signal; and
a processor operatively connected to the RF unit,
wherein the processor is configured to:
transmit configuration information on a beam restricted sub-frame to a UE, and
transmit downlink (DL) data to the UE through a sub-frame,
wherein the sub-frame includes the beam restricted sub-frame and a normal sub-frame,
wherein the configuration information includes information indicating a sub-frame set as the beam restricted sub-frame among a plurality of sub-frames,
wherein the beam restricted sub-frame is a sub-frame transmitted based on only a first beam subset,
wherein the normal sub-frame is a sub-frame transmitted based on the first beam subset and a second beam subset,
wherein the first beam subset is a set of beams that are generated based on a first precoding matrix set, and
wherein the second beam subset is a set of beams that are generated based on a second precoding matrix set including the first precoding matrix set.

7. The BS of claim 6, wherein the first beam subset is a set of vertical precoding matrixes restricting an area of a vertical beam radiated to a vertical area, and
wherein the area of the vertical beam area is a certain vertical space area where a virtual physical cell ID is assigned.

8. The BS of claim 6, wherein the beam restricted sub-frame is a sub-frame that is used only in the transmission of rank 1 or rank 2.

9. The BS of claim 6, wherein the beam restricted sub-frame is set to UEs that do not operate in multi-user multiple-input multiple-output (MU-MIMO).

10. The BS of claim 6,
wherein the processor is configured to transmit information on the first beam subset used to transmit the beam restricted sub-frame to the UE and receive channel state information (CSI) from the UE,
wherein the CSI is determined based on the information on the first beam subset.

* * * * *